Patented July 22, 1930

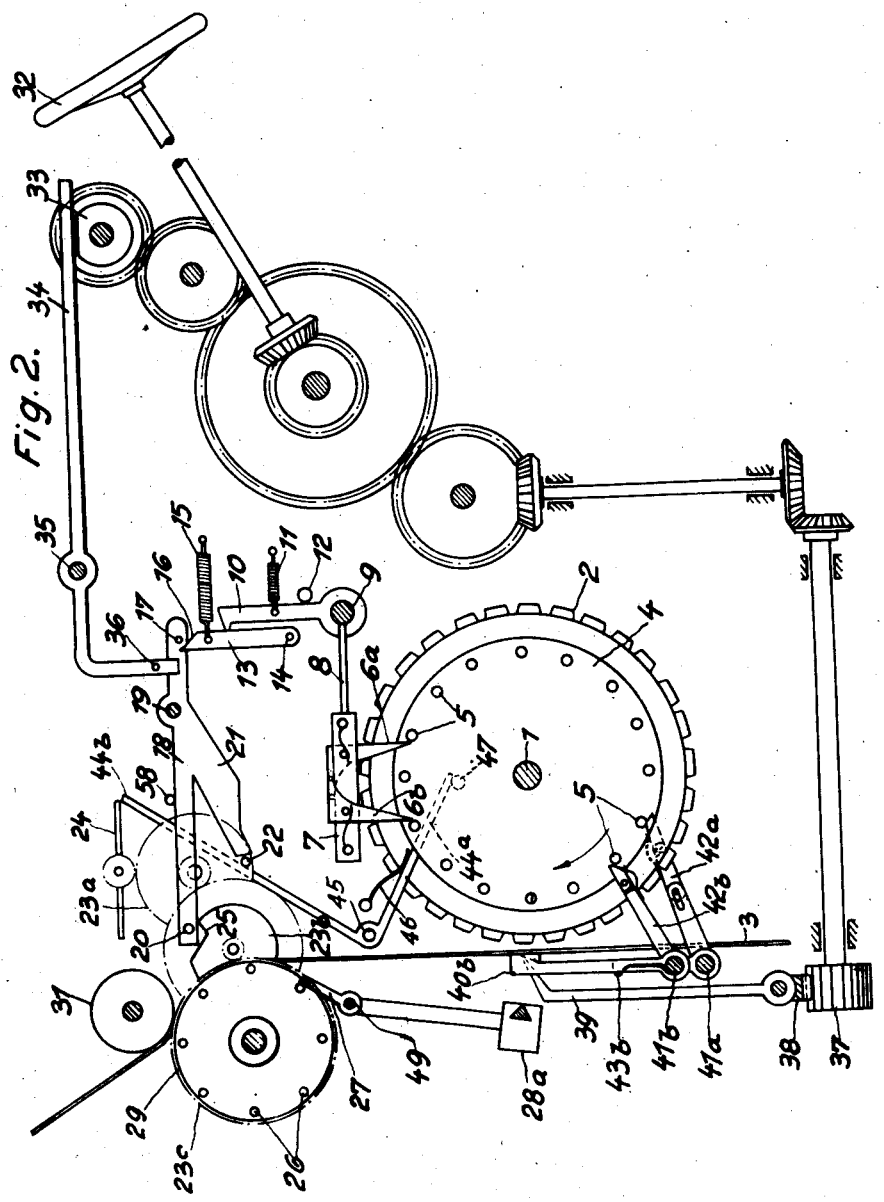

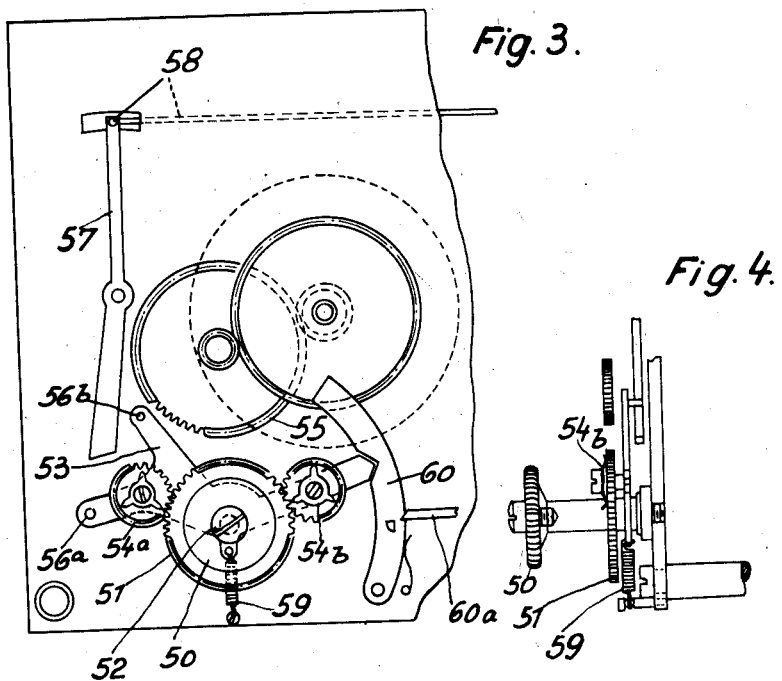

1,770,903

UNITED STATES PATENT OFFICE

NARZISS ACH AND GODEHARD WILICHOWSKI, OF GOTTINGEN, GERMANY

RECORDING APPARATUS

Application filed November 13, 1926, Serial No. 148,264, and in Germany June 4, 1926.

This invention relates to an apparatus for recording measured values, such as for instance speeds, temperatures, pressures, electric resistances, strength of current and the like, but more particularly to an apparatus for recording indications of speedometers, namely of such which are mounted on vehicles and intended for controlling or checking the working of the latter.

One of the difficulties in the case of recording instruments, is that for the purpose of recording working data extending over a long period of time when recording continuously, it is necessary to use an enormous quantity of paper, and that the subsequent examination of the record is rather difficult owing to the large size of the paper band, or web on which the record is made.

As a rule, the measuring of changes of speed, for instance of changes from the moment the vehicle or machine starts until the normal speed is reached, and during the return to a standstill, presents relatively little interest, so that it is not necessary to record these changes of speed in detail. In this way, a great deal of paper may be saved, and the diagram rendered much clearer. In view of this fact, the proceeding according to the invention is such that the recording is rendered in a certain way independent of the member of the measuring device, which is set to the value measured. According to the invention, this is accomplished in such a manner that the member of the device, which is moved in accordance with the value to be recorded, is utilized for releasing a driving gear for the paper feed, and if necessary a printing hammer, the release being effected in such a manner that thereafter the said driving gear controls the further printing process until it is again automatically brought to a standstill and thus to position ready to be released again, by the said member of the measuring device. The addition of such a time relay to the measuring device results in that, according to the duration of a working operation of this time relay, that is to say according to the period of time which elapses between the release of the time relay and the automatic stopping of the same, the total advance or feed of the paper during a given period of time can be reduced to as small a value as may be desired. This combination of the indicating member of the measuring device with a time relay controlling the printing process and released by the movable member of the measuring device, does not in itself preclude the possibility of recording the intermediate step values of the variable value to be measured. On the contrary, also in this arrangement it is possible to obtain the recording of the intermediate step values by providing—when the recording is effected by the operation of a printing hammer—in addition to the printing hammer operated by the time relay, further printing members which are operated directly by the indicating member of the measuring device. These printing members then print on the sheet of paper, already started by a separate driving gear, so that they do not impart any additional movement impulse whatever to the paper sheet. These additional records are of course not records of numerical values by type printing, but notwithstanding they give in the form of marks, for instance dashes, the exact step values which are situated between the step values indicated by the type printing.

In many cases it may be desired to combine the recording of values of different natures on the same sheet. Such a requirement exists for instance in the case of motor vehicles for which, when it is a question of deciding the responsibility for a collision, it is of decisive importance to know not only the speed of the vehicles involved in the collision, but also its direction of travel, or the position of the steering wheel during and before the collision.

According to the invention, this requirement is provided for, by making the steering wheel also capable of releasing a driving gear for the paper band and the printing hammer, apart from the speed step values, so that when the steering wheel is coupled to a pencil, the position of the steering wheel is recorded on the paper.

The driving gear for the paper released by the steering wheel, could of course be the same driving gear which is released by the indicating member of the speedometer.

The recording of the indications of measuring instruments necessitates as an indispensable supplement, the recording of the time moments at which the values in question were recorded. It is usual, accordingly, to couple in such recording instruments the measuring member of the measuring device to a time piece, and to connect both to type carriers, so that simultaneously with the printing of the position of the measuring member of the measuring device, the corresponding time is printed on the paper.

It is however known that clocks are generally more or less unreliable, owing to which the value of the records may be rendered completely illusory unless provision is made for ascertaining incorrect indications of the clock. To this end, in the construction according to the invention, provision is made for recording, when correcting the setting of the clock by means of a standard clock, also the state of the clock at the moment of the correction, and the new true time. In examining the recording process situated between two clock corrections, it is possible then to correct by interpolation the two times appearing on the recording paper.

This arrangement for printing the position of the clock indications before and after the correction, affords at the same time the means for subsequently ascertaining any unauthorized tampering with the clock.

A construction of the apparatus, described in a general way in the foregoing, is shown by way of example in the accompanying drawings, in which, for the purpose of making them clear, single parts are indicated merely diagrammatically in their co-operation and shown in different figures not in exact agreement.

In the said drawings:

Figure 1 is a side elevation of the apparatus;

Figure 2 a cross section, substantially on line 2—2 of Figure 1;

Figure 3 is a plan of the mechanism for setting the time piece;

Figure 4 is a partial view of Figure 3;

Figure 1:
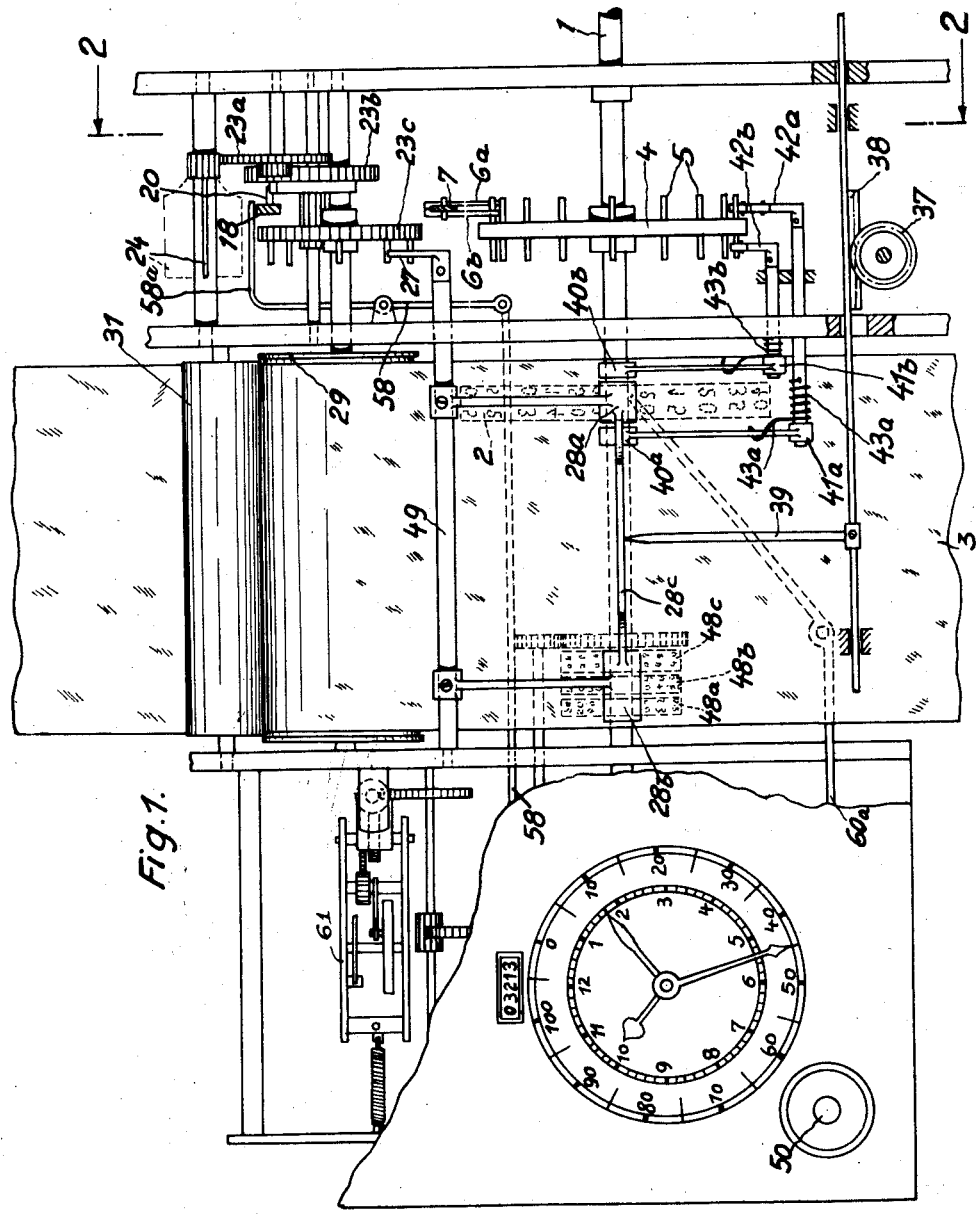

In the drawings, 1 is the shaft of the speedometer. On the same is mounted the type wheel 2, which prints the speed step on the diagram paper 3. On the shaft 1 is further mounted a pin wheel 4, the pins 5 of which act on a pair of pawls $6^a$, $6^b$ which are rotatably mounted on a support 7 that is mounted on a spring part 8 which is secured to a spindle 9 to which is also secured an arm 10 controlled by a spring 11. 12 is a stop pin for the arm 10. 13 is an arm mounted at 14 and controlled by a spring 15 and provided at its free end with a cam face 16 which is adapted to act on a pin 17 of a lever 18 rotatably mounted at 19. The lever 18 is provided with a catch pin 20 and an arm 21 with which is adapted to engage a locking pin 22 of a driving wheel of the driving gear $23^a$, $23^b$, $23^c$, whilst the catch pin 20 is adapted to engage with a recess 25 of another wheel also forming part of the driving gear $23^a$, $23^b$, $23^c$. The wheel $23^c$ of the driving gear is fitted with lifting pins 26 which are adapted to act on a hammer lever 27 in order to operate the printing hammers $28^a$ and $28^b$. The latter are mounted on a spindle 49 in such a manner as to allow resilient displacement with relation to each other. On the spindle of the driving wheel $23^c$ is mounted a roller 29 over which passes the paper band 3 which is pressed against roller 29 by means of a pressure roller 31. 32 is the steering wheel of the vehicle on which the apparatus is mounted. This steering wheel is connected by means of a suitable wheel gear, on the one hand to a cam disc 33 which is adapted to operate a lever 34 that is rotatably mounted at 35 and acts by means of a pin 36 on the lever 18. The steering wheel is moreover connected, also by means of a wheel gearing, to a toothed wheel 37 which meshes with a rack 38 to which is secured a pencil 39 which moves over the paper band 3. $40^a$ and $40^b$ are two printing levers which are rotatably mounted at $41^a$ and $41^b$ respectively and connected to arms $42^a$ or $42^b$ which project into the path of the pins 5 of the wheel 4, so that when the said wheel is rotated, according to the direction of its rotation, either the printing lever $40^a$ or the printing lever $40^b$ will be caused to strike and produce a dash on the paper band 3. The return of the levers $40^a$ and $40^b$ to their positions of rest is effected by means of springs $43^a$ or $43^b$. $44^a$ and $44^b$ is a bell crank lever pivoted at 45, which projects with its arm $44^b$ into the path of the wind vane 24 and locks the latter when the lever $44^a$, $44^b$ is turned in opposition to the action of spring 46, by the pin 47 of the wheel 4 into its position corresponding to the zero speed, so that when the vehicle is standing still, the wind vane 24 and therefore the driving gear $23^a$, $23^b$, $23^c$ for the paper sheet 3 are locked.

Figure 5:
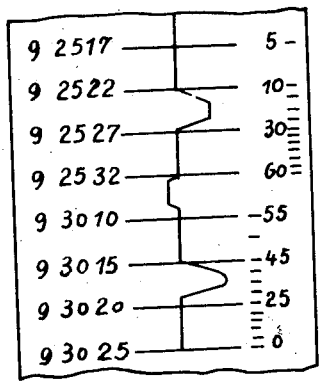
Figure 5 shows a section of the recording strip.

$48^a$, $48^b$, $48^c$ are respectively, the hour-minute and second-type wheels of the clock, to which are allotted the printing hammer $28^b$ which like the already mentioned printing hammer $28^a$, is mounted on the spindle 49, so that it is operated simultaneously with the printing hammer $28^a$ and accordingly, at each printing operation, the position of the type wheel 2 as well as of the clock type wheels $48^a$, $48^b$, $48^c$ will be recorded, as shown in the perspective view of the strip in Figure 5. 50 is a setting button for the clock, which is secured to the wheel 51 on the spindle 52 of which is loosely mounted a plate 53 in which are supported the toothed wheels 54$^a$ and 54$^b$, which can be brought to mesh with the change wheel 55 of the dial train, by turning the setting button 50. According as the setting button 50 is turned in one or in the other direction, the wheel 54$^a$ or the wheel 54$^b$ will be brought into engagement with 55. In the engaged position, a rotation of the wheel 55 is effected by the wheels 54$^a$ or 54$^b$ which take part then in the rotation of the wheel 51 by means of the setting button 50. By operating the setting button 50, the clock can therefore be set forward or backward. Simultaneously with the setting forward and backward of the clock, one of the arms 56$^a$, 56$^b$ releases the lever 57 which operates through rod 58 and lever 58$^a$ to depress the releasing lever 18, so that during the rotation of the setting button 50, the driving gear for the paper and printing hammers is released, and a printing impression takes place. The spring 59 returns the plate 53 to its central position, so that during the movement of the plate 53 owing to the movement of the button 50 as well as during its automatic return by the spring 59, the time is printed, and accordingly, as already stated, the times are printed behind each other before the correction of the clock and after the correction. During the rotation of the plate 53, the printing hammer 28$^a$ for the speed measuring device is locked by a lever 60 by means of a lever 60$^a$, so that when printing the clock time during the correction of the clock, only the times are printed, but not the speeds.

As to the actuating and controlling mechanism of the clock only the escapement thereof is illustrated in Fig. 1 of the drawing, 61 designating the bearing plates for the several axes belonging thereto.

The general working of the apparatus is as follows: when the vehicle is travelling, the speedometer comes into action, and its shaft 1 rotates on the change of speed taking place. Whenever a new speed step is reached, a pin 5 of the wheel 4 engages with one of the pawls 6$^a$, 6$^b$ and produces a release of the driving gear 23$^a$, 23$^b$, 23$^c$ provided that this gear is in the position of rest. At each release of this gear, the paper band 3 is advanced during the whole time of running of the driving gear, and the printing hammers 28$^a$, 28$^b$ are operated, and also one of the printing hammers 40$^a$ or 40$^b$ is operated according to the direction of rotation of the pin wheel 4.

If the speed of the car is changing so slowly that the driving gear 23$^a$, 23$^b$, 23$^c$ has already come to a standstill, when a new pin 5 of the wheel engages with one of the pawls 6$^a$, 6$^b$, then on each new speed being reached, there takes place a printing of the types set of the type wheel 2 of the speedometer and of the type wheels 48$^a$, 48$^b$, 48$^c$ of the clockwork. If however the speed changes more quickly, so that the driving gear 23$^a$, 23$^b$, 23$^c$ has not yet come to rest when a new pin 5 comes within range of the pawls 6$^a$, 6$^b$, no printing will be done for this speed step. The next printing of a speed step reached, will take place only when the driving gear 23$^a$, 23$^b$, 23$^c$ is released again after having come to a standstill. During this time however the intermediate speed steps which are not recorded by type printing, will be recorded by dash printing by means of the hammers 40$^a$ or 40$^b$, as these are operated at each passage of a pin 5 in front of their arm 42$^a$ or 42$^b$.

When the hammers 28$^a$, 28$^b$ strike, a horizontal dash can be printed at the same time by means of a bar 28$^c$ connecting together the hammers, such dashes being shown in Figure 5 as connection lines between corresponding time and speed indications.

The hammers 40$^a$, 40$^b$ are laterally staggered relatively to each other so that one prints its dashes indicating the intermediate speeds, on one side of the speed figures on the paper, and the other on the other side.

In addition to the speeds and times, the apparatus shown in the drawings and hereinbefore described, records also the steering motion. At each movement of the steering wheel 32 from the position of rest, there takes place, as soon as the cam disc 33 has reached a sufficient degree of deviation from its position of rest, a release of the driving gear 23$^a$, 23$^b$, 23$^c$, so that the paper is advanced and printing takes place whilst at the same time the position of the steering wheel is marked on the paper by the pencil 39. The driving gear 23$^a$, 23$^b$, 23$^c$ works and advances the paper as long as the steering wheel is out of the central position.

The result of the recording by the new apparatus will be seen in Figure 5 which presupposes a construction of the pin wheel 4 in which the distances between the pins 5 correspond to changes of speed of 5 kilometers per hour. At 9h. 25m. 17s. the vehicle had a speed of 5 km. per hour. At 9h. 25m. 22s. it reached 10 km. Then the speed quickly increased, so that at 9h. 25m. 27s. it amounted already to 30 km. The three speeds between 10 and 30 km. are not given on the paper in figures, but, in accordance with the operation of the hammer 40$^b$, in the form of three dashes arranged below each other. The quick increase of speed of the vehicle continued, so that at 9h. 25m. 32s. a speed of 60 km. was already reached.

The five speeds 35, 40, 45, 50, 55 km. are again recorded in the form of five dashes.

At 9h. 30m. 10s. the speed drops back to 55 km. At 9h. 30m. 15s. it drops already to 45 km. The speed of 50 km. is recorded by the operation of the hammer 40$^a$, again in the form of a dash, namely in accordance with the decreasing speed, on the left hand side of the indications in figures. The speed then continues to drop quickly, so that at 9h. 30m. 20s. it drops already to 25 km. The omitted speeds 40, 35, 30 km. are shown by the three dashes. At 9h. 30m. 25s. the vehicle stops. The four omitted speeds 20, 15, 10, 5 km. are recorded in the form of four dashes.

Moreover, the movement of the steering wheel 32 is also recorded on the paper. Thus at 9h. 25m. 22s. the wheel was turned to the right until at 9h. 25m. 27s. it returned to its original position. At 9h. 25m. 32s. takes place a considerably smaller turning of the steering wheel to the left. At 9h. 30m. 15s. there is again a curve to the right which at the speed of 30 km. (marked by dashes) passes into straight drive.

Figure 6:
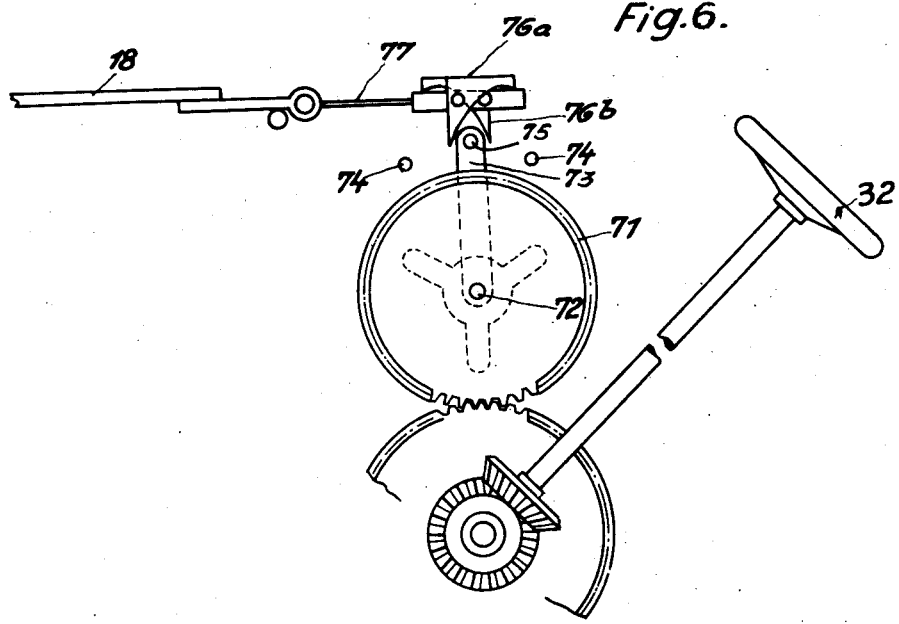
Figure 6 is a detail view of an arrangement for recording on the paper the positions of the steering wheel of the vehicle, on which the apparatus is mounted.

In certain circumstances, it may be desired to record also the points of turning of the steering wheel away from and back to normal position. Such a device is illustrated in Figure 6.

18 is again, like in the other figures, the lever intended for the release of the driving gear 23$^a$, 23$^b$, 23$^c$. 32 is again the steering wheel. 71 is a wheel rotating under the action of the steering wheel and secured to a spindle 72 on which is mounted with friction an arm 73. This arm participates in the rotation of the wheel 71 within the limits fixed by the stop pins 74 and acts by means of the pin 75 on a pair of pawls 76$^a$, 76$^b$. The latter operates, in the same way, as the pair of pawls 6$^a$, 6$^b$, by means of a spring 77, the release lever 18 of the driving gear 23$^a$, 23$^b$, 23$^c$, so that at each lateral movement of the arm 73, takes place a release of the driving gear and therefore an advance of the paper band, and an operation of the printing hammers, simultaneously with the corresponding movement of the pencil 39. The paper movement takes place only during one operation of the driving gear. At each return of the steering wheel, takes place a new release of the driving gear 23$^a$, 23$^b$, 23$^c$, so that the points of turning of the steering position, together with the corresponding times and speeds, are recorded, provided they do not take place in a quicker time than that which corresponds to the duration of one operation. In the latter case, the turning points will still be recorded, but not the corresponding times and speeds which can be found in this case only by interpolation.

What we claim is:—

1. In apparatus for obtaining a time record of the measured value of a factor, the combination with a measuring device for indicating the value of the factor, a time measuring device, type carriers controlled by each of said devices, a record sheet and printing mechanism cooperating with said type carriers, of driving means for advancing said record sheet and operating said printing mechanism, locking means normally preventing operation of said first means, and releasing means controlled by said factor measuring device to release said locking means to permit, for a predetermined limited period, the operation of said means for feeding the record sheet and operating said printing mechanism.

2. Apparatus as set forth in claim 1, wherein said releasing means includes elements for releasing said locking means at each of a predetermined series of adjustments of the said factor measuring device, said series of adjustments corresponding to a series of critical magnitudes of the factor to be recorded.

3. The invention as set forth in claim 1, in combination with supplemental printing mechanism and means for operating the same from said factor measuring device and independent of the means operating said first printing mechanism.

4. The invention as set forth in claim 1, wherein said type carriers are provided with type indicating numeral values of the factor and of time, and the printing mechanism includes means for printing upon the sheet a line joining the corresponding printed values of time and the factor to be recorded.

5. In apparatus for obtaining a time record of the speed of a vehicle, the combination with clock mechanism, a speedometer, type carriers controlled by said mechanism, a record sheet, printing hammers cooperating with said type carriers, of a driving gear for advancing said record sheet and operating said hammers, means normally locking said driving gear against operation, said locking means at each release thereof permitting operation of said driving gear for a predetermined limited period to feed said paper and operate said hammers, and releasing means controlled by said speedometer for releasing said locking means.

6. The invention as set forth in claim 5, wherein said releasing means includes elements for releasing said locking means at each of a series of predetermined speed indications of the speedometer.

7. The invention as set forth in claim 5, wherein said releasing means comprises a pin wheel rotatable with the speedometer dial, a pair of oppositely arranged pawls cooperating with the pins of said wheel, a spring arm carrying said pawls, and a linkage operable by said arm to release said locking means, said pawls being alternatively operative to control the release mechanism in accordance with the direction of rotation of said pin wheel.

In testimony whereof, we affix our signatures.

NARZISS ACH.
GODEHARD WILICHOWSKI.